US012609505B2

(12) United States Patent
Deng et al.

(10) Patent No.: US 12,609,505 B2
(45) Date of Patent: Apr. 21, 2026

(54) OPTICAL AMPLIFICATION APPARATUS AND SIGNAL AMPLIFICATION METHOD OF OPTICAL AMPLIFICATION APPARATUS

(71) Applicant: HUAWEI TECHNOLOGIES CO., LTD., Shenzhen (CN)

(72) Inventors: Ning Deng, Shenzhen (CN); Yunfei Yan, Dongguan (CN); Bo Wu, Chengdu (CN); Yongze Yu, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 980 days.

(21) Appl. No.: 17/842,300

(22) Filed: Jun. 16, 2022

(65) Prior Publication Data

US 2022/0320815 A1     Oct. 6, 2022

Related U.S. Application Data

(63) Continuation of application No. PCT/CN2020/115492, filed on Sep. 16, 2020.

(30) Foreign Application Priority Data

Dec. 17, 2019   (CN) ......................... 201911307807.9

(51) Int. Cl.
*H01S 3/30*        (2006.01)
*H01S 3/067*       (2006.01)
(Continued)

(52) U.S. Cl.
CPC .... *H01S 3/06754* (2013.01); *H01S 3/094003* (2013.01); *H01S 3/094096* (2013.01);
(Continued)

(58) Field of Classification Search
CPC .......... H01S 3/06754; H01S 3/094003; H01S 3/094096; H01S 3/10007; H01S 3/10023;
(Continued)

(56) References Cited

U.S. PATENT DOCUMENTS 5,864,423 A  *  1/1999  Kosaka ............... H04J 14/0221
                                                         398/92
7,916,386 B2 *  3/2011  DiGiovanni ....... G02B 6/02019
                                                         359/341.32
(Continued)

FOREIGN PATENT DOCUMENTS

CN          1155674 A     7/1997
CN          1167352 A     12/1997
(Continued)

OTHER PUBLICATIONS

Mimura et al., "Batch Multicore Amplification with Cladding-Pumped Multicore EDF," IEICE Technical Report, vol. 112, No. 258, The Institute of Electronics, Information and Communication Engineers, Japan, Oct. 25, 2012, pp. 151-154 (with English abstract).
(Continued)

*Primary Examiner* — Kinam Park
(74) *Attorney, Agent, or Firm* — Fish & Richardson P.C.

(57)                    ABSTRACT

Example optical amplification apparatuses and example signal amplification methods are provided. One example optical amplification apparatus is connected to an optical fiber. The optical amplification apparatus includes a first pump laser and a first gain medium. The first pump laser is configured to emit first pump light. The first gain medium is configured to receive the first pump light and first multi-channel optical signals from the optical fiber; and perform gain amplification on the first multi-channel optical signals based on the first pump light, where the first pump light overlaps each of the first multi-channel optical signals in the first gain medium.

22 Claims, 9 Drawing Sheets

(51) Int. Cl.

| | |
|---|---|
| *H01S 3/094* | (2006.01) |
| *H01S 3/10* | (2006.01) |
| *H01S 3/102* | (2006.01) |
| *H01S 3/16* | (2006.01) |
| *H01S 3/23* | (2006.01) |
| *H01S 3/00* | (2006.01) |
| *H01S 3/17* | (2006.01) |

(52) U.S. Cl.
CPC ...... *H01S 3/10007* (2013.01); *H01S 3/10023* (2013.01); *H01S 3/1022* (2013.01); *H01S 3/1608* (2013.01); *H01S 3/2308* (2013.01); *H01S 3/0064* (2013.01); *H01S 3/0071* (2013.01); *H01S 3/094* (2013.01); *H01S 3/094061* (2013.01); *H01S 3/175* (2013.01); *H01S 3/2391* (2013.01)

(58) Field of Classification Search
CPC .... H01S 3/1022; H01S 3/1608; H01S 3/2308; H01S 3/0064; H01S 3/0071; H01S 3/094; H01S 3/094061; H01S 3/175; H01S 3/2391; H01S 3/176
See application file for complete search history.

(56) References Cited

U.S. PATENT DOCUMENTS

| | | | | |
|---|---|---|---|---|
| 8,773,755 B2 * | 7/2014 | Nishihara | .......... | G02B 6/02038 |
| | | | | 359/341.1 |
| 2002/0008901 A1 * | 1/2002 | Kinoshita | ............... | H01S 3/302 |
| | | | | 359/341.1 |
| 2002/0012378 A1 * | 1/2002 | Zenteno | ............ | H01S 3/094003 |
| | | | | 372/108 |
| 2002/0159736 A1 * | 10/2002 | Dejneka | .............. | H01S 3/06716 |
| | | | | 385/127 |
| 2003/0021008 A1 * | 1/2003 | Islam | ................. | H04B 10/2916 |
| | | | | 359/334 |
| 2003/0072074 A1 * | 4/2003 | Odate | ..................... | H01S 3/302 |
| | | | | 359/341.1 |
| 2003/0095323 A1 * | 5/2003 | Onaka | ................ | H04B 10/2942 |
| | | | | 359/349 |
| 2004/0196531 A1 * | 10/2004 | Nicholson | ............... | H01S 3/094 |
| | | | | 359/334 |
| 2006/0126159 A1 * | 6/2006 | Chung | ................ | H01S 3/06754 |
| | | | | 359/334 |
| 2010/0118388 A1 * | 5/2010 | Pastouret | ................ | C01F 7/441 |
| | | | | 977/932 |
| 2013/0063809 A1 * | 3/2013 | Nishihara | .......... | H01S 3/06737 |
| | | | | 359/341.2 |
| 2014/0268311 A1 | 9/2014 | Zhu | | |
| 2015/0063767 A1 * | 3/2015 | Jauregui | ........... | G02B 6/02204 |
| | | | | 359/341.2 |
| 2016/0054519 A1 * | 2/2016 | Onaka | ..................... | H01S 3/302 |
| | | | | 359/334 |
| 2019/0115715 A1 * | 4/2019 | Hasegawa | ............. | H01S 3/0941 |

FOREIGN PATENT DOCUMENTS

| | | | |
|---|---|---|---|
| CN | 1457566 | A | 11/2003 |
| CN | 101266379 | A | 9/2008 |
| CN | 101383474 | A | 3/2009 |
| CN | 101997612 | A | 3/2011 |
| CN | 103069668 | A | 4/2013 |
| CN | 103794974 | A | 5/2014 |
| CN | 104638504 | A | 5/2015 |
| CN | 107293934 | A | 10/2017 |
| CN | 206864857 | U | 1/2018 |
| CN | 208374472 | U | 1/2019 |
| CN | 109713555 | A | 5/2019 |
| CN | 105720466 | B | 6/2019 |
| CN | 110024236 | A | 7/2019 |
| CN | 110088992 | A | 8/2019 |
| EP | 0859435 | A2 | 8/1998 |
| JP | H02210924 | A | 8/1990 |
| JP | H05190945 | A | 7/1993 |
| JP | H05315691 | A | 11/1993 |
| JP | H0998136 | A | 4/1997 |
| JP | H1012953 | A | 1/1998 |
| JP | H10200178 | A | 7/1998 |
| JP | 2000078081 | A | 3/2000 |
| JP | 2000286489 | A | 10/2000 |
| JP | 2008227994 | A | 9/2008 |
| JP | 2014096398 | A | 5/2014 |
| WO | 0004613 | A1 | 1/2000 |

OTHER PUBLICATIONS

Office Action in Japanese Appln. No. 2022-536925, mailed on Aug. 1, 2023, 9 pages (with English translation).

Seo et al., "Optical Amplification in a Bismuth-Doped Silica Glass at 1300 nm Telecommunications Window," Optics Communications, Oct. 1, 2006, 3 pages.

Office Action in Chinese Appln. No. 201911307807.9, dated Dec. 22, 2021, 15 pages (with English translation).

Extended European Search Report in European Appln No. 20900868. 9, dated Dec. 13, 2022, 10 pages.

International Search Report and Written Opinion in International Appln. No. PCT/CN2020/115492, mailed on Dec. 16, 2020, 20 pages (with English translation).

EP Communication Pursuant to Article 94(3) EPC in European Appln No. 20900868.9, dated Jul. 29, 2024, 11 pages.

* cited by examiner

Signal light spot

Pump light spot

Signal light spot

Pump light spot

1001

A first pump laser emits first pump light

1002

A first gain medium receives the first pump light and first multi-channel optical signals from an optical fiber, and performs gain amplification on the first multi-channel optical signals based on the first pump light

1

OPTICAL AMPLIFICATION APPARATUS AND SIGNAL AMPLIFICATION METHOD OF OPTICAL AMPLIFICATION APPARATUS

CROSS-REFERENCE TO RELATED APPLICATIONS

This application is a continuation of International Application No. PCT/CN2020/115492, filed on Sep. 16, 2020, which claims priority to Chinese Patent Application No. 201911307807.9, filed on Dec. 17, 2019. The disclosures of the aforementioned applications are hereby incorporated by reference in their entireties.

TECHNICAL FIELD

This application relates to the optical communications field, and in particular, to an optical amplification apparatus and a signal amplification method of an optical amplification apparatus.

BACKGROUND

In an optical network, an optical signal usually needs to be amplified due to an optical power loss, so that the optical signal has enough power and performance to be received by a receiver. For example, an erbium-doped fiber amplifier (EDFA) may be usually used to amplify the optical signal.

In actual application, generally, a plurality of channels of optical signals need to be amplified. Currently, a plurality of channels of optical amplifiers are mainly implemented through accumulation. For example, a plurality of EDFAs form an EDFA array. Each EDFA is separately configured to amplify each channel of an optical signal. It can be learned that a large quantity of EDFAs are needed to implement the plurality of channels of optical amplifiers. In this case, the implementation costs are high.

SUMMARY

Embodiments of this application provide an optical amplification apparatus and a signal amplification method of an optical amplification apparatus. It is unnecessary to dispose a plurality of optical amplification apparatuses to separately amplify each channel of an optical signal, to reduce the costs.

According to a first aspect, an embodiment of this application provides an optical amplification apparatus. The optical amplification apparatus is connected to an optical fiber. The optical amplification apparatus includes a first pump laser and a first gain medium. The first pump laser is configured to emit first pump light. The first gain medium is configured to receive the first pump light and first multi-channel optical signals from the optical fiber. The first pump light may excite population inversion of the first gain medium, to perform gain amplification on the first multi-channel optical signals. It should be noted that, to implement gain amplification on each of the first multi-channel optical signals, the first pump light overlaps each of the first multi-channel optical signals in the first gain medium.

In this implementation, the first gain medium may receive the first pump light emitted by the first pump laser and the first multi-channel optical signals from the optical fiber. The first pump light overlaps each of the first multi-channel optical signals in the first gain medium. Therefore, the first gain medium may perform gain amplification on each of the first multi-channel optical signals based on the first pump light. It can be learned from this that the optical amplification apparatus in this application may implement amplification on a plurality of channels of optical signals. It is unnecessary to dispose a plurality of optical amplification apparatuses to separately amplify each channel of an optical signal, to reduce the costs.

Optionally, in some possible implementations, the optical amplification apparatus further includes a first beam shaping structure. The first beam shaping structure is configured to: shape the first pump light, and couple the shaped first pump light to the first gain medium. The shaped first pump light overlaps each of the first multi-channel optical signals in the first gain medium.

In this implementation, a beam shape of the first pump light may be irregular. Therefore, the first pump light is first shaped by using the first shaping structure, to implement a better effect that the shaped first pump light overlaps each of the first multi-channel optical signals in the first gain medium.

Optionally, in some possible implementations, a direction in which the first pump light is incident to the first gain medium is the same as a direction in which the first multi-channel optical signals are incident to the first gain medium. The optical amplification apparatus further includes a multiplexing structure. The multiplexing structure is configured to: perform multiplexing on the first pump light and the first multi-channel optical signals to obtain a multiplexed signal, and transmit the multiplexed signal to the first gain medium.

In this implementation, the multiplexing structure may first perform multiplexing on the first pump light and the first multi-channel optical signals, so that the first pump light and the first multi-channel optical signals after the multiplexing are incident to the first gain medium in the same direction. A specific implementation of implementing overlapping between the first pump light and each of the first multi-channel optical signals in the first gain medium is provided, to improve practicality of this solution.

Optionally, in some possible implementations, a direction in which the first pump light is incident to the first gain medium is different from a direction in which the first multi-channel optical signals are incident to the first gain medium.

In this implementation, in some scenarios, even if the direction in which the first pump light is incident to the first gain medium is different from a direction in which the first multi-channel optical signals are incident to the first gain medium, the first pump light may still overlap each of the first multi-channel optical signals in the first gain medium. For example, the first gain medium is a cube, the first multi-channel optical signals are incident from a left plane of the first gain medium, and the first pump light is incident from a lower plane of the first gain medium, to extend practicality of this solution.

Optionally, in some possible implementations, the optical amplification apparatus further includes an isolator. The isolator is configured to suppress incidence of reflected echo light of the first multi-channel optical signals to the first gain medium.

In this implementation, the isolator is a passive component that allows light to pass in one direction and prevents light from passing in an opposite direction. A function of the isolator is to limit directions of light, so that light can be only transmitted in a single direction. The reflected echo light of the optical fiber can be well isolated, which avoid impacts on performance due to reflection back and forth in a light amplification process.

Optionally, in some possible implementations, the first multi-channel optical signals are transmitted in a first direction. The optical amplification apparatus further includes a first filtering structure, a second filtering structure, and a second gain medium. The first filtering structure is configured to: transmit a first optical signal in the first multi-channel optical signals to the first gain medium, and reflect a second optical signal in the first multi-channel optical signals to the second gain medium. A wavelength of the first optical signal is different from a wavelength of the second optical signal. The first pump light overlaps the first optical signal in the first gain medium. The first gain medium is configured to perform gain amplification on the first optical signal based on the first pump light. The second gain medium is configured to: receive the first pump light, and perform gain amplification on the second optical signal based on the first pump light. The first pump light overlaps the second optical signal in the second gain medium. The second filtering structure is configured to: transmit, in the first direction, the first optical signal on which gain amplification is performed, and reflect the second optical signal on which gain amplification is performed, so that the reflected second optical signal on which gain amplification is performed is transmitted in the first direction.

In this implementation, the optical amplification apparatus may further separately perform gain amplification on the first multi-channel optical signals in a waveband division manner. In other words, the first gain medium performs gain amplification on the first optical signal, and the second gain medium performs gain amplification on the second optical signal, thereby extending an application scenario in this solution.

Optionally, in some possible implementations, the first multi-channel optical signals are transmitted in a first direction. The optical amplification apparatus further includes a first filtering structure, a second filtering structure, a second gain medium, a second pump laser, and a second beam shaping structure. The second pump laser is configured to emit second pump light. The second beam shaping structure is configured to: shape the second pump light, and couple the shaped second pump light to the second gain medium. The first filtering structure is configured to: transmit a first optical signal in the first multi-channel optical signals to the first gain medium, and reflect a second optical signal in the first multi-channel optical signals to the second gain medium. A wavelength of the first optical signal is different from a wavelength of the second optical signal. The first pump light overlaps the first optical signal in the first gain medium. The second pump light overlaps the second optical signal in the second gain medium. The first gain medium is configured to perform gain amplification on the first optical signal based on the first pump light. The second gain medium is configured to perform gain amplification on the second optical signal based on the second pump light. The second filtering structure is configured to: transmit, in the first direction, the first optical signal on which gain amplification is performed, and reflect the second optical signal on which gain amplification is performed, so that the reflected second optical signal on which gain amplification is performed is transmitted in the first direction.

This implementation is different from the previous implementation. In a scenario in which two gain mediums separately perform gain amplification on the first multi-channel optical signals in a waveband division manner, the second pump laser may be further newly added to specifically provide the second pump light for the second gain medium.

In addition, the second beam shaping structure may also be added to shape the second pump light, thereby improving flexibility of this solution.

Optionally, in some possible implementations, the optical amplification apparatus further includes a first reflection element and a second reflection element. The first reflection element is configured to reflect, to the second gain medium, the second optical signal reflected by the first filtering structure. The second reflection element is configured to reflect, to the second filtering structure, the second optical signal on which gain amplification is performed.

In this implementation, the first reflection element and the second reflection element may change a transmission optical path of the second optical signal and that of the second optical signal on which gain amplification is performed. In this way, the second optical signal is incident to the second gain medium, and the second optical signal on which gain amplification is performed is incident to the second filtering structure, thereby further improving practicability of this solution.

Optionally, in some possible implementations, the first multi-channel optical signals are transmitted in a first direction. The optical amplification apparatus further includes a first filtering structure, a second filtering structure, and a second gain medium. The first filtering structure is configured to transmit the first multi-channel optical signals to the first gain medium. The second filtering structure is configured to: transmit, in the first direction, the first multi-channel optical signals on which gain amplification is performed, and reflect, to the second gain medium, second multi-channel optical signals transmitted in a second direction. A wavelength of the first multi-channel optical signals is different from a wavelength of the second multi-channel optical signals. The first direction is opposite to the second direction. The second gain medium is configured to: receive the first pump light, and perform gain amplification on the second multi-channel optical signals based on the first pump light. The first pump light overlaps the second multi-channel optical signals in the second gain medium. The first filtering structure is further configured to reflect the second multi-channel optical signals on which gain amplification is performed, so that the reflected second multi-channel optical signals on which gain amplification is performed are transmitted in the second direction.

In this implementation, the optical amplification apparatus may be further applied to a bidirectional transmission scenario. In other words, the first gain medium performs gain amplification on the first multi-channel optical signals transmitted in the first direction, and the second gain medium performs gain amplification on the second multi-channel optical signals transmitted in the second direction, thereby extending an application scenario in this solution.

Optionally, in some possible implementations, the first multi-channel optical signals are transmitted in a first direction. The optical amplification apparatus further includes a first filtering structure, a second filtering structure, a second pump laser, a second gain medium, and a second beam shaping structure. The first filtering structure is configured to transmit the first multi-channel optical signals to the first gain medium. The second filtering structure is configured to: transmit, in the first direction, the first multi-channel optical signals on which gain amplification is performed, and reflect, to the second gain medium, second multi-channel optical signals transmitted in a second direction. A wavelength of the first multi-channel optical signals is different from a wavelength of the second multi-channel optical signals. The first direction is opposite to the second direction. The second pump laser is configured to emit second pump light. The second beam shaping structure is configured to: shape the second pump light, and couple the shaped second pump light to the second gain medium. The shaped second pump light overlaps each of the second multi-channel optical signals in the second gain medium. The second gain medium is configured to perform gain amplification on the second multi-channel optical signals based on the second pump light. The first filtering structure is further configured to reflect the second multi-channel optical signals on which gain amplification is performed, so that the reflected second multi-channel optical signals on which gain amplification is performed are transmitted in the second direction.

This implementation is different from the previous implementation. The second pump laser may be further newly added to specifically provide the second pump light for the second gain medium. In addition, the second beam shaping structure may also be added to shape the second pump light, thereby improving flexibility of this solution.

Optionally, in some possible implementations, the optical amplification apparatus further includes a first reflection element and a second reflection element. The second reflection element is configured to reflect, to the second gain medium, the second multi-channel optical signals reflected by the second filtering structure. The first reflection element is configured to reflect, to the first filtering structure, the second multi-channel optical signals on which gain amplification is performed.

In this implementation, the first reflection element and the second reflection element may change a transmission optical path of the second multi-channel optical signals and that of the second multi-channel optical signals on which gain amplification is performed. In this way, the second multi-channel optical signals are incident to the second gain medium, and the second multi-channel optical signals on which gain amplification is performed are incident to the first filtering structure, thereby further improving practicability of this solution.

Optionally, in some possible implementations, the first multi-channel optical signals are transmitted in a first direction. The optical amplification apparatus further includes a reflection component, a first filtering structure, and a second filtering structure. The second filtering structure is configured to reflect, to the reflection component, second multi-channel optical signals transmitted in a second direction. A wavelength of the first multi-channel optical signals is different from a wavelength of the second multi-channel optical signals. The first direction is opposite to the second direction. The reflection component is configured to reflect the second multi-channel optical signals to the first filtering structure. The first filtering structure is configured to: transmit the first multi-channel optical signals to the first gain medium, and reflect the second multi-channel optical signals to the first gain medium. The first gain medium is further configured to perform gain amplification on the second multi-channel optical signals based on the first pump light. The first pump light overlaps each of the second multi-channel optical signals in the first gain medium. The second filtering structure is further configured to: transmit, in the first direction, the first multi-channel optical signals on which gain amplification is performed, and reflect, to the reflection component, the second multi-channel optical signals on which gain amplification is performed. The reflection component is further configured to reflect, to the first filtering structure, the second multi-channel optical signals on which gain amplification is performed. The first filtering structure is further configured to reflect the second multi-channel optical signals on which gain amplification is performed, so that the second multi-channel optical signals on which gain amplification is performed and that are reflected by the first filtering structure are transmitted in the second direction.

In this implementation, an implementation of using only one gain medium to perform gain amplification on a plurality of channels of optical signals from two directions is provided, thereby further improving scalability of this solution.

Optionally, in some possible implementations, the reflection component includes a first reflection element, a second reflection element, a third reflection element, and a fourth reflection element. The second reflection element is configured to reflect, to the first reflection element, the second multi-channel optical signals reflected by the second filtering structure. The first reflection element is configured to reflect the second multi-channel optical signals to the first filtering structure. The third reflection element is configured to reflect, to the fourth reflection element, the second multi-channel optical signals on which gain amplification is performed and that are reflected by the second filtering structure. The fourth reflection element is configured to reflect, to the first filtering structure, the second multi-channel optical signals on which gain amplification is performed.

In this implementation, the four reflection elements may change a transmission optical path of the second multi-channel optical signals and that of the second multi-channel optical signals on which gain amplification is performed. In this way, the second multi-channel optical signals are incident to the first gain medium, and the second multi-channel optical signals on which gain amplification is performed are incident to the first filtering structure, thereby further improving practicability of this solution.

Optionally, in some possible implementations, a material of the first gain medium is different from a material of the second gain medium. The first gain medium includes an erbium-doped, a bismuth-doped, or a praseodymium-doped glass block. The second gain medium includes an erbium-doped, a bismuth-doped, or a praseodymium-doped glass block. The first beam shaping structure includes a diffractive optical element DOE or a lens combination. A type of the optical fiber includes a bundled optical fiber or a multi-core optical fiber.

In this implementation, a plurality of materials of the first gain medium and the second gain medium are provided. A specific device implementation of the first beam shaping structure is provided. A plurality of types of optical fibers are further provided, thereby improving practicality of this solution.

Optionally, in some possible implementations, a transmission direction of the first multi-channel optical signals may be a direction in which an optical line terminal (OLT) transmits a signal to an optical network unit (ONU), and a transmission direction of the second multi-channel optical signals is a direction in which the ONU transmits a signal to the OLT. Alternatively, a transmission direction of the first multi-channel optical signals is a direction in which an ONU transmits a signal to an OLT, and a transmission direction of the second multi-channel optical signals is a direction in which the OLT transmits a signal to the ONU.

In this implementation, the optical amplification apparatus may be applied to a passive optical network (PON) scenario. The optical amplification apparatus can perform gain amplification on both an uplink signal and a downlink signal.

According to a second aspect, an embodiment of this application provides a signal amplification method of an optical amplification apparatus. The optical amplification apparatus is connected to an optical fiber. The optical amplification apparatus includes a first pump laser and a first gain medium.

The method includes: The first pump laser emits first pump light. The first gain medium receives the first pump light and first multi-channel optical signals from the optical fiber, and performs gain amplification on the first multi-channel optical signals based on the first pump light. The first pump light overlaps each of the first multi-channel optical signals in the first gain medium.

Optionally, in some possible implementations, the optical amplification apparatus further includes a first beam shaping structure.

The method further includes: The first beam shaping structure shapes the first pump light, and couples the shaped first pump light to the first gain medium. The shaped first pump light overlaps each of the first multi-channel optical signals in the first gain medium.

Optionally, in some possible implementations, a direction in which the first pump light is incident to the first gain medium is the same as a direction in which the first multi-channel optical signals are incident to the first gain medium. The optical amplification apparatus further includes a multiplexing structure.

The method further includes: The multiplexing structure performs multiplexing on the first pump light and the first multi-channel optical signals to obtain a multiplexed signal, and transmits the multiplexed signal to the first gain medium.

Optionally, in some possible implementations, a direction in which the first pump light is incident to the first gain medium is different from a direction in which the first multi-channel optical signals are incident to the first gain medium.

Optionally, in some possible implementations, the optical amplification apparatus further includes an isolator.

The method further includes: The isolator suppresses incidence of an optical signal whose direction is different from a transmission direction of the first multi-channel optical signals to the first gain medium.

Optionally, in some possible implementations, the first multi-channel optical signals are transmitted in a first direction. The optical amplification apparatus further includes a first filtering structure, a second filtering structure, and a second gain medium.

The method further includes: The first filtering structure transmits a first optical signal in the first multi-channel optical signals to the first gain medium, and reflects a second optical signal in the first multi-channel optical signals to the second gain medium. A wavelength of the first optical signal is different from a wavelength of the second optical signal. The first pump light overlaps the first optical signal in the first gain medium. The first gain medium performs gain amplification on the first optical signal based on the first pump light. The second gain medium receives the first pump light, and performs gain amplification on the second optical signal based on the first pump light. The first pump light overlaps the second optical signal in the second gain medium. The second filtering structure transmits, in the first direction, the first optical signal on which gain amplification is performed, and reflects the second optical signal on which gain amplification is performed, so that the reflected second optical signal on which gain amplification is performed is transmitted in the first direction.

Optionally, in some possible implementations, the first multi-channel optical signals are transmitted in a first direction. The optical amplification apparatus further includes a first filtering structure, a second filtering structure, a second gain medium, a second pump laser, and a second beam shaping structure.

The method further includes: The second pump laser emits second pump light. The second beam shaping structure shapes the second pump light, and couples the shaped second pump light to the second gain medium. The first filtering structure transmits a first optical signal in the first multi-channel optical signals to the first gain medium, and reflects a second optical signal in the first multi-channel optical signals to the second gain medium. A wavelength of the first optical signal is different from a wavelength of the second optical signal. The first pump light overlaps the first optical signal in the first gain medium. The second pump light overlaps the second optical signal in the second gain medium. The first gain medium performs gain amplification on the first optical signal based on the first pump light. The second gain medium performs gain amplification on the second optical signal based on the second pump light. The second filtering structure transmits, in the first direction, the first optical signal on which gain amplification is performed, and reflects the second optical signal on which gain amplification is performed, so that the reflected second optical signal on which gain amplification is performed is transmitted in the first direction.

Optionally, in some possible implementations, the optical amplification apparatus further includes a first reflection element and a second reflection element.

The method further includes: The first reflection element reflects, to the second gain medium, the second optical signal reflected by the first filtering structure. The second reflection element reflects, to the second filtering structure, the second optical signal on which gain amplification is performed.

Optionally, in some possible implementations, the first multi-channel optical signals are transmitted in a first direction. The optical amplification apparatus further includes a first filtering structure, a second filtering structure, and a second gain medium.

The method further includes: The first filtering structure transmits the first multi-channel optical signals to the first gain medium. The second filtering structure transmits, in the first direction, the first multi-channel optical signals on which gain amplification is performed, and reflects, to the second gain medium, second multi-channel optical signals transmitted in a second direction. A wavelength of the first multi-channel optical signals is different from a wavelength of the second multi-channel optical signals. The first direction is opposite to the second direction. The second gain medium receives the first pump light, and performs gain amplification on the second multi-channel optical signals based on the first pump light. The first pump light overlaps the second multi-channel optical signals in the second gain medium. The first filtering structure reflects the second multi-channel optical signals on which gain amplification is performed, so that the reflected second multi-channel optical signals on which gain amplification is performed are transmitted in the second direction.

Optionally, in some possible implementations, the first multi-channel optical signals are transmitted in a first direction. The optical amplification apparatus further includes a first filtering structure, a second filtering structure, a second pump laser, a second gain medium, and a second beam shaping structure.

The method further includes: The first filtering structure transmits the first multi-channel optical signals to the first gain medium. The second filtering structure transmits, in the first direction, the first multi-channel optical signals on which gain amplification is performed, and reflects, to the second gain medium, second multi-channel optical signals transmitted in a second direction. A wavelength of the first multi-channel optical signals is different from a wavelength of the second multi-channel optical signals. The first direction is opposite to the second direction. The second pump laser emits second pump light. The second beam shaping structure shapes the second pump light, and couples the shaped second pump light to the second gain medium. The shaped second pump light overlaps each of the second multi-channel optical signals in the second gain medium. The second gain medium performs gain amplification on the second multi-channel optical signals based on the second pump light. The first filtering structure reflects the second multi-channel optical signals on which gain amplification is performed, so that the reflected second multi-channel optical signals on which gain amplification is performed are transmitted in the second direction.

Optionally, in some possible implementations, the optical amplification apparatus further includes a first reflection element and a second reflection element.

The method further includes: The second reflection element reflects, to the second gain medium, the second multi-channel optical signals reflected by the second filtering structure. The first reflection element reflects, to the first filtering structure, the second multi-channel optical signals on which gain amplification is performed.

Optionally, in some possible implementations, the first multi-channel optical signals are transmitted in a first direction. The optical amplification apparatus further includes a reflection component, a first filtering structure, and a second filtering structure.

The method further includes: The second filtering structure reflects, to the reflection component, second multi-channel optical signals transmitted in a second direction. A wavelength of the first multi-channel optical signals is different from a wavelength of the second multi-channel optical signals. The first direction is opposite to the second direction. The reflection component reflects the second multi-channel optical signals to the first filtering structure. The first filtering structure transmits the first multi-channel optical signals to the first gain medium, and reflects the second multi-channel optical signals to the first gain medium. The first gain medium performs gain amplification on the second multi-channel optical signals based on the first pump light. The first pump light overlaps each of the second multi-channel optical signals in the first gain medium. The second filtering structure transmits, in the first direction, the first multi-channel optical signals on which gain amplification is performed, and reflects, to the reflection component, the second multi-channel optical signals on which gain amplification is performed. The reflection component reflects, to the first filtering structure, the second multi-channel optical signals on which gain amplification is performed. The first filtering structure reflects the second multi-channel optical signals on which gain amplification is performed, so that the second multi-channel optical signals on which gain amplification is performed and that are reflected by the first filtering structure are transmitted in the second direction.

Optionally, in some possible implementations, the reflection component includes a first reflection element, a second reflection element, a third reflection element, and a fourth reflection element.

The method further includes: The second reflection element reflects, to the first reflection element, the second multi-channel optical signals reflected by the second filtering structure. The first reflection element reflects the second multi-channel optical signals to the first filtering structure. The third reflection element reflects, to the fourth reflection element, the second multi-channel optical signals on which gain amplification is performed and that are reflected by the second filtering structure. The fourth reflection element reflects, to the first filtering structure, the second multi-channel optical signals on which gain amplification is performed.

Optionally, in some possible implementations, a material of the first gain medium is different from a material of the second gain medium. The first gain medium includes an erbium-doped, a bismuth-doped, or a praseodymium-doped glass block. The second gain medium includes an erbium-doped, a bismuth-doped, or a praseodymium-doped glass block. Specifically, an element set doped in the first gain medium 102 may be different from an element set doped in the second gain medium 111. For example, the first gain medium 102 is an erbium-doped glass block, and the second gain medium 111 may be a bismuth-doped or a praseodymium-doped glass block. Alternatively, a proportion of an element doped in the first gain medium 102 may be different from that of an element doped in the second gain medium 111. For example, an erbium doping proportion of the first gain medium 102 is 20%, and an erbium doping proportion of the second gain medium 1 is 50%. Alternatively, a glass base of the first gain medium 102 may be different from a glass base of the second gain medium 111. For example, the first gain medium 102 is a quartz (silica) glass block, and the second gain medium 111 is a phosphorus (phosphorus salt) glass block.

The first beam shaping structure includes a diffractive optical element DOE or a lens combination. A type of the optical fiber includes a bundled optical fiber or a multi-core optical fiber.

Optionally, in some possible implementations, a transmission direction of the first multi-channel optical signals may be a direction in which an OLT transmits a signal to an ONU, and a transmission direction of the second multi-channel optical signals is a direction in which the ONU transmits a signal to the OLT. Alternatively, a transmission direction of the first multi-channel optical signals is a direction in which an ONU transmits a signal to an OLT, and a transmission direction of the second multi-channel optical signals is a direction in which the OLT transmits a signal to the ONU.

It can be learned from the foregoing technical solutions that embodiments of this application have the following advantages:

In the embodiments of this application, the first gain medium may receive the first pump light emitted by the first pump laser and the first multi-channel optical signals from the optical fiber. The first pump light overlaps each of the first multi-channel optical signals in the first gain medium. Therefore, the first gain medium may perform gain amplification on each of the first multi-channel optical signals based on the first pump light. It can be learned from this that the optical amplification apparatus in this application may implement amplification on the plurality of channels of optical signals. It is unnecessary to dispose a plurality of optical amplification apparatuses to separately amplify each channel of an optical signal, to reduce the costs.

DESCRIPTION OF EMBODIMENTS

The embodiments of this application provide an optical amplification apparatus and a signal amplification method of an optical amplification apparatus. It is unnecessary to dispose a plurality of optical amplification apparatuses to separately amplify each channel of an optical signal, to reduce the implementation costs. In this specification, the claims, and the accompanying drawings of this application, terms "first", "second", "third", "fourth", and the like (if exist) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, terms "include", "have", and any other variants thereof mean to cover non-exclusive inclusion. For example, a process, method, system, product, or device that includes a list of steps or units is not necessarily limited to those steps or units expressly listed, but may include other steps or units not expressly listed or inherent to such a process, method, product, or device.

This application may be mainly applied to a passive optical network (PON). The passive optical network indicates an optical distribution network (ODN) between an optical line terminal (OLT) and an optical network unit (ONU). The passive optical network does not include any active electronic device.

Figure 1:
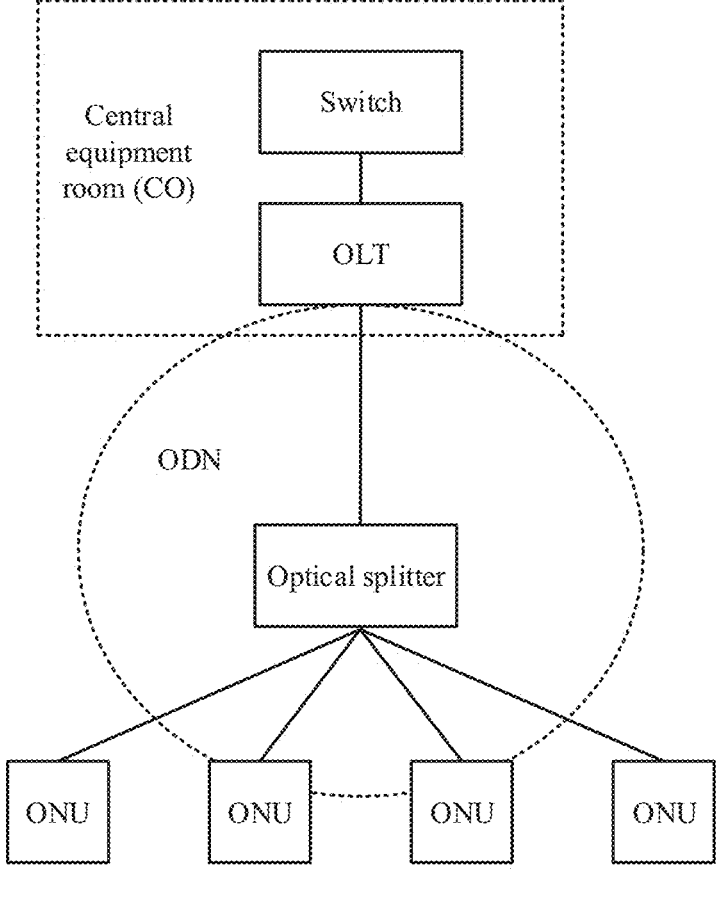
FIG. 1 is a schematic diagram of a network structure of a PON.

FIG. 1 is a schematic diagram of a network structure of a PON. An OLT is used to provide a network-side interface for an optical access network (OAN). The OLT is connected to a network-side device (for example, a switch or a router) at an upper layer, and is connected to one or more ODNs at a lower layer. The ONU provides a user-side interface for the OAN and is connected to the ODN. The ODN includes a passive optical splitter for optical power allocation, a feeder fiber connected between the passive optical splitter and the OLT, and a distribution fiber connected between the passive optical splitter and an ONU. During downlink data transmission, the ODN transmits downlink data of the OLT to each ONU by using an optical splitter. Similarly, during uplink data transmission, the ODN aggregates uplink data of the ONUs and transmits the data to the OLT.

The technical solutions of the embodiments of this application may be applied to compatibility between various PON systems. For example, the PON system includes: a next-generation PON (NG-PON), an NG-PON 1, an NG-PON 2, a gigabit-capable PON (GPON), a 10 gigabit per second PON (XG-PON), a 10-gigabit-capable symmetric passive optical network (XGS-PON), an Ethernet PON (Ethernet PON, EPON), a 10 gigabit per second EPON (10G-EPON), a next-generation EPON (NG-EPON), a wavelength division multiplexing (WDM) PON, a time wavelength division multiplexing (TWDM) PON, a point-to-point (P2P) WDM PON (P2P-WDM PON), an asynchronous transfer mode PON (APON), a broadband PON (BPON), a 25 gigabit per second PON (25G-PON), a 50 gigabit per second PON (50G-PON), a 100 gigabit per second PON (10G-PON), a 25 gigabit per second EPON (25G-EPON), a 50 gigabit per second EPON (50G-EPON), a 100 gigabit per second EPON (100G-EPON), a GPON and an EPON at another rate, and the like.

A problem of an optical power loss is serious in the PON. Currently, a relatively expensive optical module with a higher power level is used to resolve the problem. However, with further improvement of a subsequent rate in the PON, introducing an optical amplification apparatus is an option.

Figure 2:
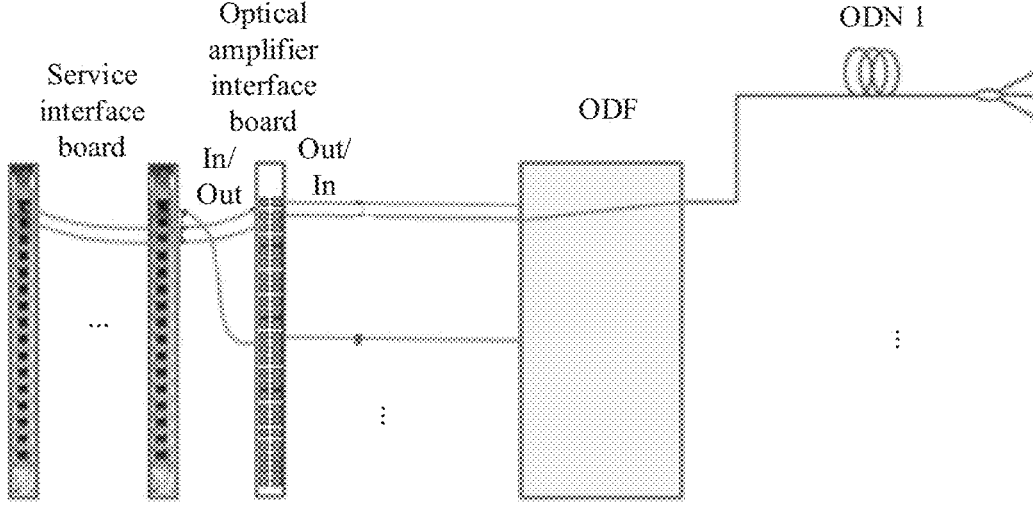
FIG. 2 is a schematic diagram of a network connection of an OLT.

FIG. 2 is a schematic diagram of a network connection of an OLT. The OLT may include a plurality of service interface boards. The service interface board may be connected to an optical interface on one side of an optical amplifier interface board through an optical fiber. An optical interface on the other side of the optical amplifier interface board is connected to a port on one side of an optical distribution frame. A port on the other side of the ODF is connected to an outdoor optical fiber of the ODN. The optical amplification apparatus in this application may be disposed between optical interfaces on the two sides of the optical amplifier interface board.

Figure 3:
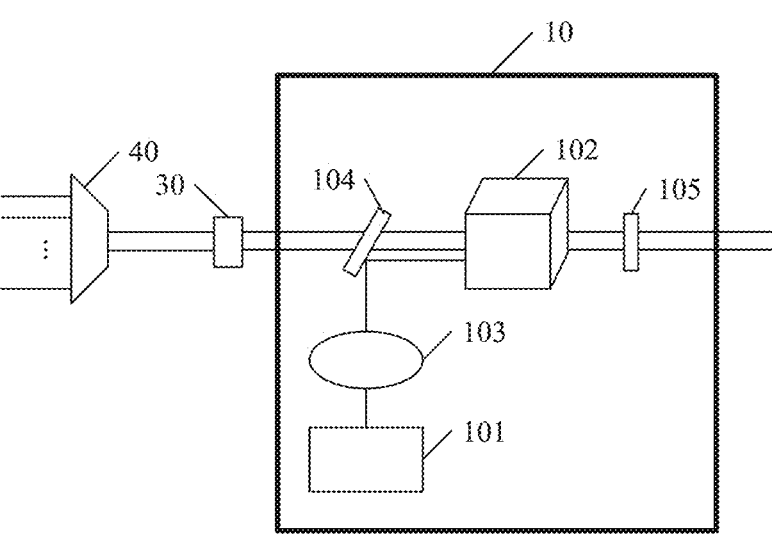
FIG. 3 is a schematic diagram of a structure of a first optical amplification apparatus according to an embodiment of this application.

FIG. 3 is a schematic diagram of a structure of a first optical amplification apparatus according to an embodiment of this application. The multiplexer 40 may combine a plurality of optical fibers from a service interface board into a bundled optical fiber 20. The bundled optical fiber may be understood as an optical fiber including a plurality of fiber cores. Each fiber core corresponds to one channel of an optical signal. An end of the bundled optical fiber 20 is connected to a lens array 30. The lens array 30 may perform beam collimation on each channel of an optical signal in the bundled optical fiber 20, to couple the channels of optical signals in space to form first multi-channel optical signals. The first multi-channel optical signals are transmitted to the optical amplification apparatus 10.

Optionally, the multiplexer 40 may not be disposed in some application scenarios. In other words, the service interface board is directly connected to the bundled optical fiber. In addition, another type of a multi-core optical fiber may be used to replace the bundled optical fiber 20, for example, a strip optical fiber. This is not specifically limited herein.

Optionally, the lens array 30 may be a micro mirror array using a microelectromechanical system (MEMS), an optical fiber collimator array, or the like. This is not specifically limited herein.

The following further describes a structure of the optical amplification apparatus 10.

The optical amplification apparatus 10 includes a first pump laser 101 and a first gain medium 102. The first pump laser 101 emits first pump light. The first gain medium 102 receives the first pump light and the first multi-channel optical signals from the bundled optical fiber 20, and performs gain amplification on the first multi-channel optical signals based on the first pump light. Specifically, the first pump light may excite population inversion of the first gain medium 102, to provide gain amplification for the first multi-channel optical signals. The first gain medium 102 may be an erbium-doped glass block. In addition, the first gain medium 102 may be a glass block doped with another rare-earth element. For example, the first gain medium may be a bismuth-doped or a praseodymium-doped glass block. This is not specifically limited herein.

It should be noted that, to implement gain amplification on each of the first multi-channel optical signals, the first pump light needs to overlap each of the first multi-channel optical signals in the first gain medium 102. In other words, a beam of the first pump light intersects with a beam of each channel of an optical signal in the first gain medium 102. Specifically, overlapping between the first pump light and each channel of an optical signal or intersection between the first pump light and each channel of an optical signal may be understood as overlapping between the first pump light and each channel of an optical channel in the first gain medium 102.

Optionally, the optical amplification apparatus 10 further includes a first beam shaping structure 103. The first beam shaping structure 103 is configured to: shape the first pump light, and couple the shaped first pump light to the first gain medium 102. The first pump light shaped by the first beam shaping structure 103 may better overlap each channel of an optical signal.

Optionally, the first beam shaping structure may include a diffractive optical element (DOE), a lens combination, or the like.

Figure 4A:
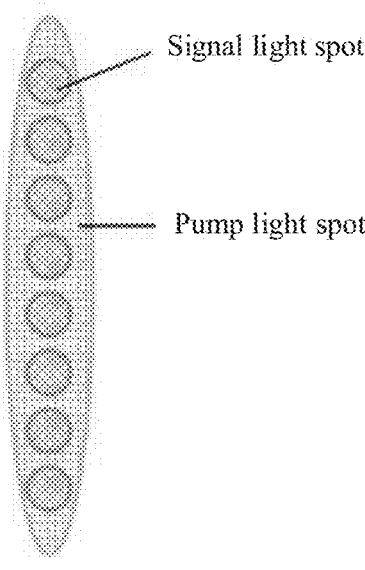
FIG. 4(a) is a schematic diagram of overlapping between pump light and an optical signal.
Figure 4B:
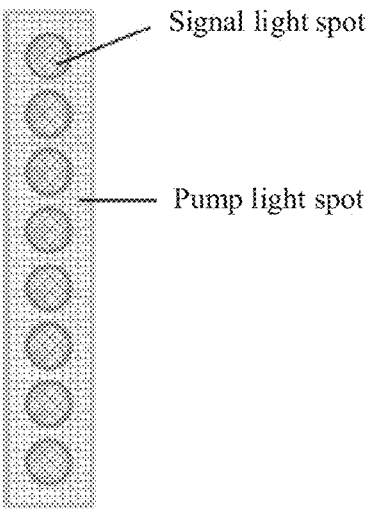
FIG. 4(b) is another schematic diagram of overlapping between pump light and an optical signal.

FIG. 4(*a*) is a schematic diagram of overlapping between pump light and an optical signal. It can be learned that a pump light spot is an oval Gaussian light spot. Generally, a pump light spot shown in FIG. 4(*a*) may be obtained through shaping the first pump light by using a spherical lens combination. Because energy of the oval pump light spot is not evenly distributed, pump energy of each signal light spot is different.

FIG. 4(*b*) is another schematic diagram of overlapping between pump light and an optical signal. It can be learned that a pump light spot is a rectangular light spot whose pump energy is evenly distributed. In this case, pump energy of each signal light spot is approximately the same. In comparison with the pump light spot shown in FIG. 4(*a*), more complex beam shaping needs to be performed to obtain a pump light spot shown in FIG. 4(*b*).

Optionally, a direction in which the first pump light is incident to the first gain medium 102 may be the same as or different from a direction in which the first multi-channel optical signals are incident to the first gain medium 102. The following separately describes a plurality of implementations:

Implementation 1:

As shown in FIG. 3, the optical amplification apparatus 10 may further include a first multiplexing structure 104. The first multiplexing structure 104 is configured to perform multiplexing on the shaped first pump light and the first multi-channel optical signals. The first pump light and the first multi-channel optical signals after the multiplexing are incident from the same side of the first gain medium 102. The first multiplexing structure 104 may be specifically a wavelength division multiplexer (also referred to as a multiplexer). The first multiplexing structure 104 is configured to multiplex two or more types of optical carrier signals (carrying various types of information) with different wavelengths.

Figure 5A:
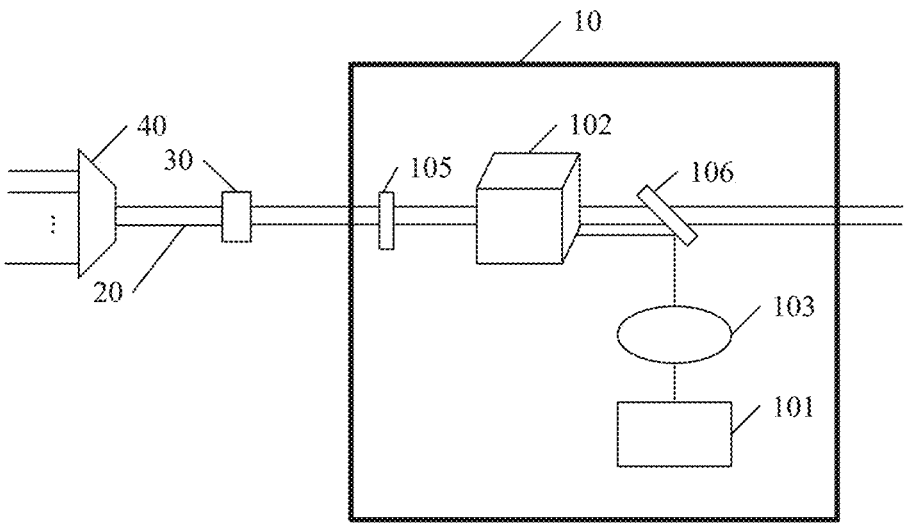
FIG. 5(a) is a schematic diagram of incidence of pump light to a gain medium.
Figure 5B:
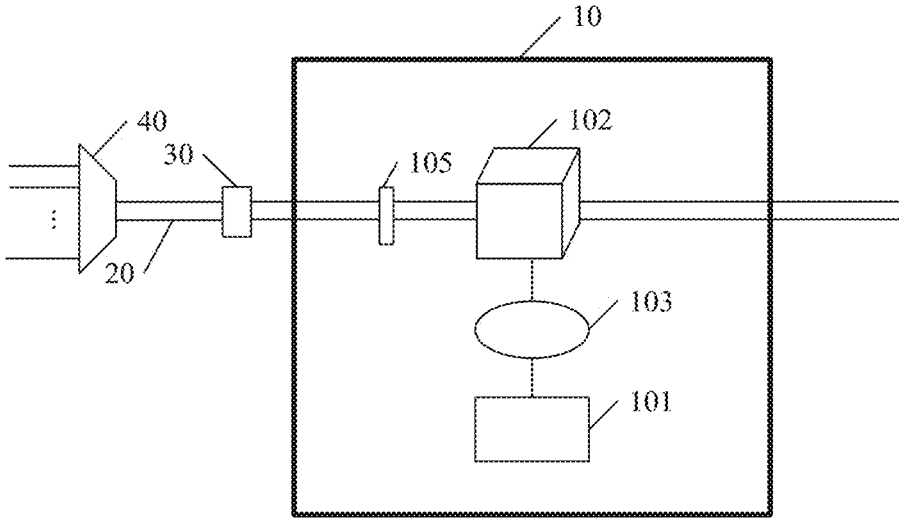
FIG. 5(b) is another schematic diagram of incidence of pump light to a gain medium.

Implementation 2:

FIG. 5(*a*) is a schematic diagram of incidence of pump light to a gain medium. The optical amplification apparatus 10 may further include a reflection structure 106. The reflection structure 106 is configured to reflect the shaped first pump light to the first gain medium 102. It can be learned that the first multi-channel optical signals are incident from a left side of the first gain medium 102, and the first pump light is incident from a right side of the first gain medium 102.

Implementation 3:

FIG. 5(*b*) is another schematic diagram of incidence of pump light to a gain medium. It can be learned that the first multi-channel optical signals are incident from a left side of the first gain medium 102, and the first pump light is incident from a lower side of the first gain medium 102.

It should be noted that there may be one or more first pump lasers 101. It is assumed that there are a plurality of pump lasers such as a pump laser A and a pump laser B. Multiplexing may be first performed for the pump laser A and the pump laser B by using an optical fiber. Then, the pump light after the multiplexing is incident to the first gain medium 102 after the shaping of the first beam shaping structure 103. In addition, the pump light emitted by the pump laser A may be incident to the first gain medium 102 after the shaping of the beam shaping structure A, and the pump light emitted by the pump laser B may be incident to the first gain medium 102 after the shaping of the beam shaping structure B. In addition, the pump light emitted by the pump laser A and the pump light emitted by the pump laser B may be incident from the same side of the first gain medium 102, or may be incident from different sides of the first gain medium 102. This is not specifically limited herein.

Optionally, the optical amplification apparatus 10 may further include a first isolator (Isolator, ISO) 105. The first isolator 105 is a passive component that allows light to pass in one direction and prevents light from passing in an opposite direction. A function of the first isolator 105 is to limit directions of light, so that light can be only transmitted in a single direction. Reflected echo light of the optical fiber can be well isolated. In other words, the first isolator 105 may suppress incidence of reflected echo light or noise of the first multi-channel optical signals to the first gain medium, to limit a transmission direction of the first multi-channel optical signals, which avoids impacts on performance due to reflection back and forth in an amplification process of the first multi-channel optical signals. Specifically, the first isolator 105 may be disposed on both sides of the first gain medium 102, to improve isolation effects.

In the embodiments of this application, the first gain medium may receive the first pump light emitted by the first pump laser and the first multi-channel optical signals from the optical fiber. The first pump light overlaps each of the first multi-channel optical signals in the first gain medium. Therefore, the first gain medium may perform gain amplification on each of the first multi-channel optical signals based on the first pump light. It can be learned from this that the optical amplification apparatus in this application may implement amplification on a plurality of channels of optical signals. It is unnecessary to dispose a plurality of optical amplification apparatuses to separately amplify each channel of an optical signal, to reduce the costs.

It should be noted that the first multi-channel optical signals may be multi-wavelength signals. The optical amplification apparatus 10 in this application may further divide wavebands for the multi-wavelength signals, and separately perform gain amplification on optical signals on different wavebands. Further description is provided below.

Figure 6:
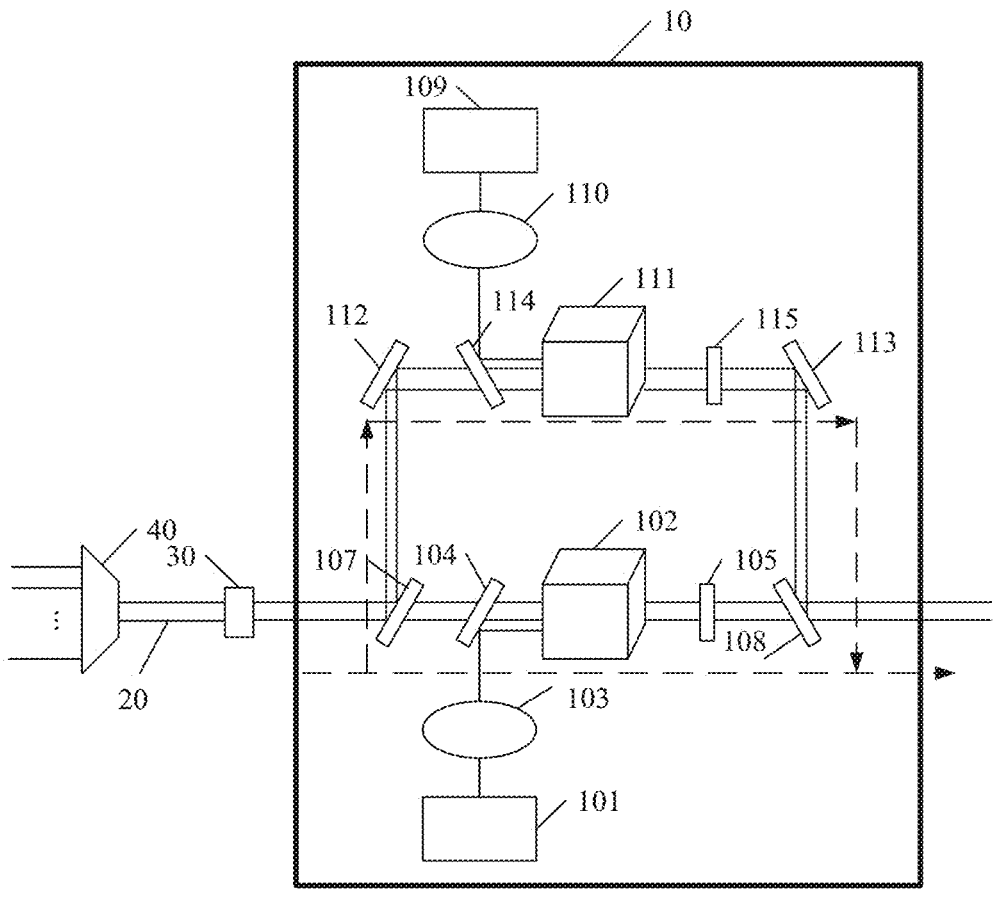
FIG. 6 is a schematic diagram of a structure of a second optical amplification apparatus according to an embodiment of this application.

FIG. 6 is a schematic diagram of a structure of a second optical amplification apparatus according to an embodiment of this application.

Different from the optical amplification apparatus shown in FIG. 3, the optical amplification apparatus 10 may further include a first filtering structure 107, a second filtering structure 108, a second pump laser 109, a second beam shaping structure 110, a second gain medium 111, a first reflection element 112, a second reflection element 113, a second multiplexing structure 114, and a second isolator 115.

Specifically, the first filtering structure 107 transmits a first optical signal in the first multi-channel optical signals, and reflects a second optical signal in the first multi-channel optical signals, to implement waveband division for the first multi-channel optical signals. A wavelength of the first optical signal is different from a wavelength of the second optical signal. The first multiplexing structure 104 may perform multiplexing on the first pump light and the first optical signal, and transmit the multiplexed signal to the first gain medium 102. The first gain medium performs gain amplification on the first optical signal based on the first pump light.

The reflection element 112 reflects the second optical signal to the second multiplexing structure 114. The second pump laser generates second pump light. The second beam shaping structure shapes the second pump light. The second multiplexing structure 114 performs multiplexing on the second optical signal and the second pump light, and transmits the multiplexed signal to the second gain medium 111. In other words, the second pump light overlaps the second optical signal reflected by the reflection element 112 in the second gain medium 111. The second gain medium 111 performs gain amplification on the second optical signal based on the second pump light. The reflection element 113 reflects, to the second filtering structure 108, the second optical signal on which gain amplification is performed.

The second filtering structure 108 transmits the first optical signal, and reflects the second optical signal, to implement multiplexing on the first optical signal and the second optical signal. A direction of an optical path of the first optical signal and a direction of an optical path of the second optical signal are shown as dashed lines in FIG. 6. The first isolator 105 is configured to limit a transmission direction of the first optical signal. The second isolator 115 is configured to limit a transmission direction of the second optical signal.

Optionally, in some application scenarios, the first pump laser 101 may be used to provide pump light for the first gain medium 102 and the second gain medium 111. Description is provided below with reference to the accompanying drawings.

Figure 7:
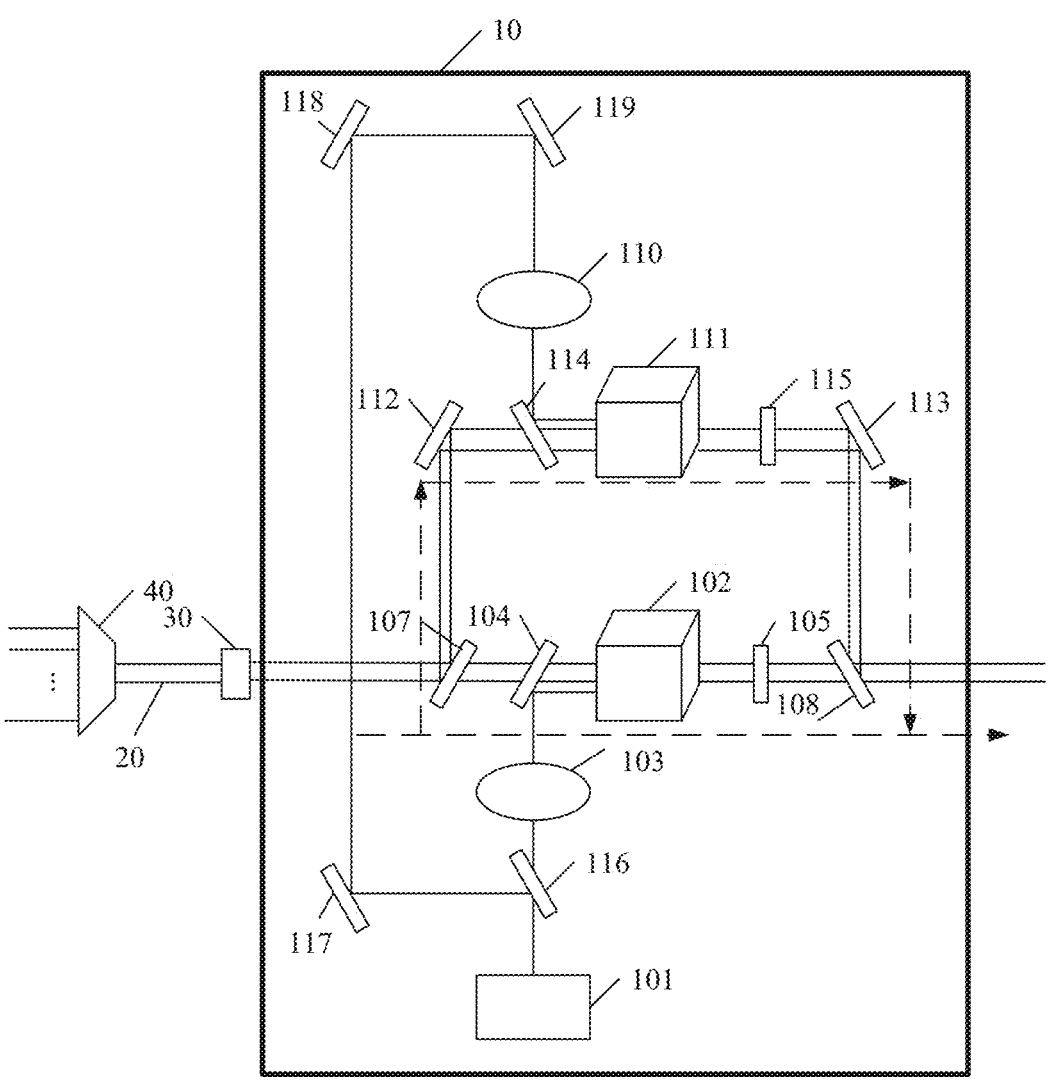
FIG. 7 is a schematic diagram of a structure of a third optical amplification apparatus according to an embodiment of this application.

FIG. 7 is a schematic diagram of a structure of a third optical amplification apparatus according to an embodiment of this application. A difference between the third optical amplification apparatus and the optical amplification apparatus shown in FIG. 6 is that the first pump light emitted by the first pump laser 101 is divided into two beams of pump light through a beam splitting element 116. One beam of pump light shaped by the first beam shaping structure 103 is multiplexed with the first optical signal. The other beam of pump light is first reflected by a reflection element 117, a reflection element 118, and a reflection element 119, and then is incident to the second beam shaping structure 110. Then, the other beam of pump light shaped by the second beam shaping structure 110 is multiplexed with the second optical signal.

Optionally, the second gain medium 111 is similar to the first gain medium 102. The second gain medium 111 may also be a glass block doped with a rare earth element such as erbium, bismuth, or praseodymium. However, a material of the first gain medium 102 is different from a material of the second gain medium 111, to separately perform gain amplification on optical signals with different wavelengths. Specifically, an element set doped in the first gain medium 102 may be different from an element set doped in the second gain medium 111. For example, the first gain medium 102 is an erbium-doped glass block, and the second gain medium 111 may be a bismuth-doped or a praseodymium-doped glass block. Alternatively, a proportion of an element doped in the first gain medium 102 may be different from that of an element doped in the second gain medium 111. For example, an erbium doping proportion of the first gain medium 102 is 20%, and an erbium doping proportion of the second gain medium 111 is 50%. Alternatively; a glass base of the first gain medium 102 may be different from a glass base of the second gain medium 111. For example, the first gain medium 102 is a quartz (silica) glass block, and the second gain medium 111 is a phosphorus (phosphorus salt) glass block.

It should be noted that, in some application scenarios, optical signals in two directions may be simultaneously transmitted in one optical fiber (briefly referred to as single-fiber bidirectional). In other words, an optical signal transmitted from the OLT to the ONU occupies a wavelength of a first waveband, and an optical signal transmitted from the ONU to the OLT occupies a wavelength of a second waveband. For example, in a PON scenario, the first waveband may be a waveband including 1490 nm and 1577 nm wavelengths, and the second waveband may be a waveband including 1270 nm and 1310 nm wavelengths. In a metro wavelength division application, the first waveband may be a C waveband, and the second waveband may be an L waveband; or the first waveband includes a part of a wavelength of a C waveband, and the second waveband includes the other part of the wavelength of the C waveband different from the first waveband.

The following separately describes a plurality of possible structures of optical amplification apparatuses applied to the foregoing single-fiber bidirectional scenario in this application. For ease of description, the first multi-channel optical signals indicate optical signals transmitted by the OLT to the ONU, and the second multi-channel optical signals indicate optical signals transmitted by the ONU to the OLT. A first direction indicates a transmission direction from the OLT to the ONU, and a second direction indicates a transmission direction from the ON U to the OLT.

Figure 8:
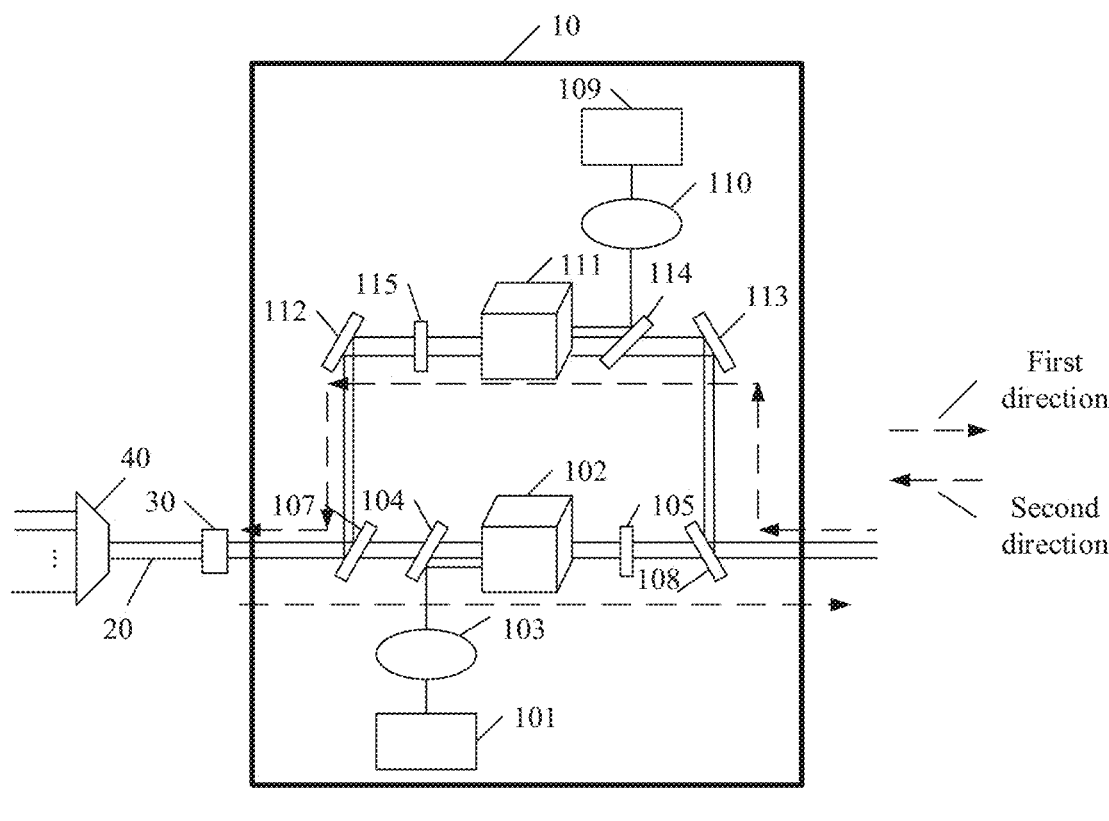
FIG. 8 is a schematic diagram of a structure of a fourth optical amplification apparatus according to an embodiment of this application.

FIG. 8 is a schematic diagram of a structure of a fourth optical amplification apparatus according to an embodiment of this application. A structure of the fourth optical amplification apparatus is similar to a structure of the optical amplification apparatus shown in FIG. 6. A main difference is different optical signal transmission directions. Description is further provided below.

The first filtering structure 107 transmits the first multi-channel optical signals in the first direction. The first multiplexing structure 104 performs multiplexing on the shaped first pump light and the first multi-channel optical signals, and transmits the multiplexed signal to the first gain medium 102. The first gain medium 102 performs gain amplification on the first multi-channel optical signals based on the first pump light. The second filtering structure 108 transmits, in the first direction, the first multi-channel optical signals on which gain amplification is performed.

The second filtering structure 108 reflects the second multi-channel optical signals to the second reflection element 113. The reflection element 113 reflects the second multi-channel optical signals to the second multiplexing structure 114. The second multiplexing structure 114 performs multiplexing on the shaped second pump light and the second multi-channel optical signals, and transmits the multiplexed signal to the second gain medium 111. The second gain medium 111 performs gain amplification on the second multi-channel optical signals based on the second pump light. The reflection element 112 reflects, to the first filtering structure 107, the second multi-channel optical signals on which gain amplification is performed. The first filtering structure 107 reflects the second multi-channel optical signals on which gain amplification is performed, so that the second multi-channel optical signals on which gain amplification is performed continue to be transmitted in the second direction. The first isolator 105 is configured to limit a transmission direction of the first multi-channel optical signals. The second isolator 115 is configured to limit a transmission direction of the second multi-channel optical signals. Specifically, a direction of an optical path of the first multi-channel optical signals and a direction of an optical path of the second multi-channel optical signals are shown as dashed lines in FIG. 8.

Specifically, both sides of the optical amplification apparatus 10 are connected to optical fibers. The first multi-channel optical signals come from the optical fiber on one side, and the second multi-channel optical signals should come from the optical fiber on the other side. A PON scenario is used as an example. The first multi-channel optical signals may be downlink optical signals transmitted by the OLT to the ONU, and the second multi-channel optical signals may be uplink optical signals transmitted by the ONU to the OLT.

Optionally, the optical amplification apparatus in the single-fiber bidirectional scenario may also use a structure similar to that shown in FIG. 7. In other words, the first pump laser 101 may provide pump light for the first gain medium 102 and the second gain medium 111. Details are not described herein again.

Figure 9:
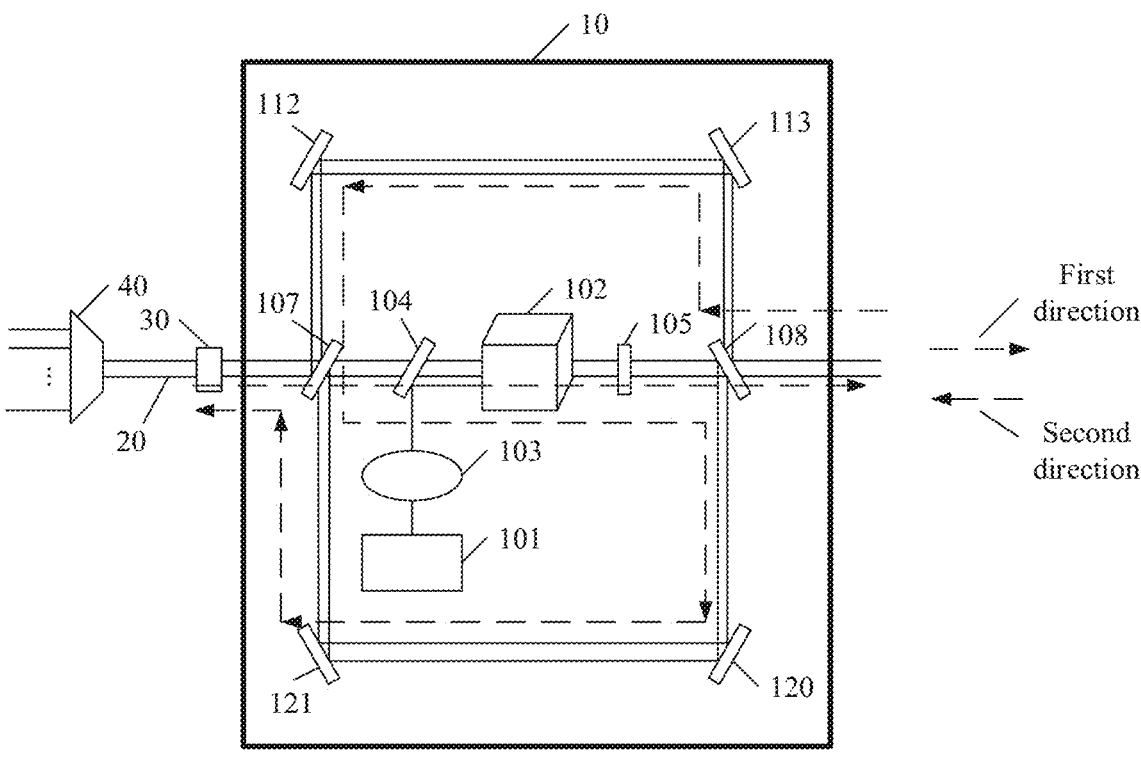
FIG. 9 is a schematic diagram of a structure of a fifth optical amplification apparatus according to an embodiment of this application.

FIG. 9 is a schematic diagram of a structure of a fifth optical amplification apparatus according to an embodiment of this application. A main difference between the fifth optical amplification apparatus and the optical amplification apparatus shown in FIG. 8 is that the first gain medium 102 performs gain amplification on the first multi-channel optical signals and the second multi-channel optical signals. Description is further provided below.

The first filtering structure 107 transmits the first multi-channel optical signals in the first direction. The first multiplexing structure 104 performs multiplexing on the shaped first pump light and the first multi-channel optical signals, and transmits the multiplexed signal to the first gain medium 102. The first gain medium 102 performs gain amplification on the first multi-channel optical signals based on the first pump light. The second filtering structure 108 transmits, in the first direction, the first multi-channel optical signals on which gain amplification is performed.

The second filtering structure 108 reflects the second multi-channel optical signals to the reflection element 113. The reflection element 113 reflects the second multi-channel optical signals to the reflection element 112. The reflection element 112 reflects the second multi-channel optical signals to the first filtering structure 107. The first filtering structure 107 reflects the second multi-channel optical signals to the first multiplexing structure 104. The first multiplexing structure 104 performs multiplexing on the shaped first pump light and the second multi-channel optical signals, and transmits the multiplexed signal to the first gain medium 102. The first gain medium 102 performs gain amplification on the second multi-channel optical signals based on the first pump light. The second filtering structure 108 reflects, to the reflection element 120, the second multi-channel optical signals on which gain amplification is performed. The reflection element 120 reflects, to the reflection element 121, the second multi-channel optical signals on which gain amplification is performed. The reflection element 121 reflects, to the first filtering structure 107, the second multi-channel optical signals on which gain amplification is performed. The first filtering structure 107 reflects the second multi-channel optical signals on which gain amplification is performed, so that the second multi-channel optical signals on which gain amplification is performed continue to be transmitted in the second direction. Specifically, a direction of an optical path of the first multi-channel optical signals and a direction of an optical path of the second multi-channel optical signals are shown as dashed lines in FIG. 9.

Figure 10:
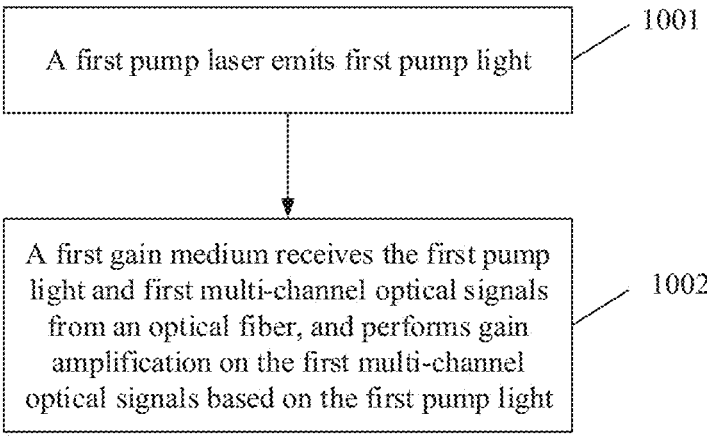
FIG. 10 is a schematic diagram of an embodiment of a signal amplification method of an optical amplification apparatus according to an embodiment of this application.

An embodiment shown in FIG. 10 provides a signal amplification method of an optical amplification apparatus according to an embodiment. In this example, the signal amplification method includes the following steps.

It should be noted that the optical amplification apparatus in this embodiment may be specifically the optical amplification apparatus in any one of the foregoing embodiments shown in FIG. 3 and FIG. 5(*a*) to FIG. 9. To simplify the description, FIG. 3 is used as an example in the following description.

1001: The first pump laser emits first pump light.

1002: The first gain medium receives the first pump light and first multi-channel optical signals from the optical fiber, and performs gain amplification on the first multi-channel optical signals based on the first pump light.

In this embodiment, to implement gain amplification on each of the first multi-channel optical signals, the first pump light overlaps each of the first multi-channel optical signals in the first gain medium. Specifically, the first pump light may excite population inversion of the first gain medium 102, to provide gain amplification for the first multi-channel optical signals.

Optionally, the first beam shaping structure may shape the first pump light, and couple the shaped first pump light to the first gain medium. Better overlapping effects are implemented between the shaped pump light and each channel of an optical signal.

Optionally, the first multiplexing structure may further perform multiplexing on the shaped first pump light and the first multi-channel optical signals. The first pump light and the first multi-channel optical signals after the multiplexing are incident from the same side of the first gain medium. In addition, the first pump light and the first multi-channel optical signals may be alternatively separately incident from different sides of the first gain medium. For details, refer to related descriptions in the embodiments shown in FIG. 5(a) and FIG. 5(b). Details are not described herein again.

Optionally, the first isolator may suppress incidence of reflected echo light or noise of the first multi-channel optical signals to the first gain medium, to limit a transmission direction of the first multi-channel optical signals, which avoids impacts on performance due to reflection back and forth in an amplification process of the first multi-channel optical signals.

It should be noted that, in addition to the foregoing described signal amplification method of an optical amplification apparatus shown in FIG. 3, reference may be made to related description of the embodiment parts shown in FIG. 5(a) to FIG. 9 for the signal amplification method of an optical amplification apparatus in the embodiments shown in FIG. 5(a) to FIG. 9. Details are not described herein again.

It should be noted that the foregoing embodiments are merely intended to describe the technical solutions of this application other than to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An optical amplification apparatus, wherein the optical amplification apparatus is connected to an optical fiber, and the optical amplification apparatus comprises a first pump laser and a first gain medium, wherein the first pump laser is configured to emit first pump light, and wherein the first gain medium is configured to:
   receive the first pump light and first multi-channel optical signals from the optical fiber; and
   perform gain amplification on the first multi-channel optical signals based on the first pump light, wherein a beam of the first pump light intersects with a beam of each of the first multi-channel optical signals in the first gain medium.

2. The optical amplification apparatus according to claim 1, wherein the optical amplification apparatus further comprises a first beam shaping structure, and wherein the first beam shaping structure is configured to:
   shape the first pump light; and
   couple the shaped first pump light to the first gain medium, wherein the shaped first pump light overlaps each of the first multi-channel optical signals in the first gain medium.

3. The optical amplification apparatus according to claim 1, wherein a direction in which the first pump light is incident to the first gain medium is the same as a direction in which the first multi-channel optical signals are incident to the first gain medium, and the optical amplification apparatus further comprises a multiplexing structure, and wherein the multiplexing structure is configured to:

perform multiplexing on the first pump light and the first multi-channel optical signals to obtain a multiplexed signal; and
   transmit the multiplexed signal to the first gain medium.

4. The optical amplification apparatus according to claim 1, wherein a direction in which the first pump light is incident to the first gain medium is different from a direction in which the first multi-channel optical signals are incident to the first gain medium.

5. The optical amplification apparatus according to claim 1, wherein the optical amplification apparatus further comprises an isolator, and wherein the isolator is configured to suppress incidence of reflected echo light of the first multi-channel optical signals to the first gain medium.

6. The optical amplification apparatus according to claim 1, wherein:
   the first multi-channel optical signals are transmitted in a first direction, and the optical amplification apparatus further comprises a first filtering structure, a second filtering structure, and a second gain medium;
   the first filtering structure is configured to:
      transmit a first optical signal in the first multi-channel optical signals to the first gain medium; and
      reflect a second optical signal in the first multi-channel optical signals to the second gain medium, wherein a wavelength of the first optical signal is different from a wavelength of the second optical signal, and the first pump light overlaps the first optical signal in the first gain medium;
   the first gain medium is configured to perform gain amplification on the first optical signal based on the first pump light;
   the second gain medium is configured to:
      receive the first pump light; and
      perform gain amplification on the second optical signal based on the first pump light, wherein the first pump light overlaps the second optical signal in the second gain medium; and
   the second filtering structure is configured to:
      transmit, in the first direction, the first optical signal on which gain amplification is performed; and
      reflect the second optical signal on which gain amplification is performed, wherein the reflected second optical signal on which gain amplification is performed is transmitted in the first direction.

7. The optical amplification apparatus according to claim 1, wherein:
   the first multi-channel optical signals are transmitted in a first direction, and the optical amplification apparatus further comprises a first filtering structure, a second filtering structure, a second gain medium, a second pump laser, and a second beam shaping structure;
   the second pump laser is configured to emit second pump light;
   the second beam shaping structure is configured to:
      shape the second pump light; and
      couple the shaped second pump light to the second gain medium;
   the first filtering structure is configured to:
      transmit a first optical signal in the first multi-channel optical signals to the first gain medium; and
      reflect a second optical signal in the first multi-channel optical signals to the second gain medium, wherein a wavelength of the first optical signal is different from a wavelength of the second optical signal, the first pump light overlaps the first optical signal in the first gain medium, and the second pump light over-laps the second optical signal in the second gain medium;

the first gain medium is configured to perform gain amplification on the first optical signal based on the first pump light;

the second gain medium is configured to perform gain amplification on the second optical signal based on the second pump light; and the second filtering structure is configured to:

transmit, in the first direction, the first optical signal on which gain amplification is performed; and reflect the second optical signal on which gain ampli-fication is performed, wherein the reflected second optical signal on which gain amplification is per-formed is transmitted in the first direction.

8. The optical amplification apparatus according to claim 6, wherein:

the optical amplification apparatus further comprises a first reflection element and a second reflection element;

the first reflection element is configured to reflect, to the second gain medium, the second optical signal reflected by the first filtering structure; and the second reflection element is configured to reflect, to the second filtering structure, the second optical signal on which gain amplification is performed.

9. The optical amplification apparatus according to claim 1, wherein:

the first multi-channel optical signals are transmitted in a first direction, and the optical amplification apparatus further comprises a first filtering structure, a second filtering structure, and a second gain medium;

the first filtering structure is configured to transmit the first multi-channel optical signals to the first gain medium;

the second filtering structure is configured to:

transmit, in the first direction, the first multi-channel optical signals on which gain amplification is per-formed; and reflect, to the second gain medium, second multi-channel optical signals transmitted in a second direc-tion, wherein a wavelength of the first multi-channel optical signals is different from a wavelength of the second multi-channel optical signals, and the first direction is opposite to the second direction;

the second gain medium is configured to:

receive the first pump light; and perform gain amplification on the second multi-channel optical signals based on the first pump light, wherein the first pump light overlaps the second multi-chan-nel optical signals in the second gain medium; and the first filtering structure is further configured to reflect the second multi-channel optical signals on which gain amplification is performed, wherein the reflected sec-ond multi-channel optical signals on which gain ampli-fication is performed are transmitted in the second direction.

10. The optical amplification apparatus according to claim 1, wherein:

the first multi-channel optical signals are transmitted in a first direction, and the optical amplification apparatus further comprises a first filtering structure, a second filtering structure, a second pump laser, a second gain medium, and a second beam shaping structure;

the first filtering structure is configured to transmit the first multi-channel optical signals to the first gain medium;

the second filtering structure is configured to:

transmit, in the first direction, the first multi-channel optical signals on which gain amplification is per-formed; and reflect, to the second gain medium, second multi-channel optical signals transmitted in a second direc-tion, wherein a wavelength of the first multi-channel optical signals is different from a wavelength of the second multi-channel optical signals, and the first direction is opposite to the second direction;

the second pump laser is configured to emit second pump light;

the second beam shaping structure is configured to:

shape the second pump light; and couple the shaped second pump light to the second gain medium, wherein the shaped second pump light overlaps each of the second multi-channel optical signals in the second gain medium;

the second gain medium is configured to perform gain amplification on the second multi-channel optical sig-nals based on the second pump light; and the first filtering structure is further configured to reflect the second multi-channel optical signals on which gain amplification is performed, wherein the reflected sec-ond multi-channel optical signals on which gain ampli-fication is performed are transmitted in the second direction.

11. The optical amplification apparatus according to claim 9, wherein:

the optical amplification apparatus further comprises a first reflection element and a second reflection element;

the second reflection element is configured to reflect, to the second gain medium, the second multi-channel optical signals reflected by the second filtering struc-ture; and the first reflection element is configured to reflect, to the first filtering structure, the second multi-channel optical signals on which gain amplification is performed.

12. The optical amplification apparatus according to claim 1, wherein:

the first multi-channel optical signals are transmitted in a first direction, and the optical amplification apparatus further comprises a reflection component, a first filter-ing structure, and a second filtering structure;

the second filtering structure is configured to reflect, to the reflection component, second multi-channel optical signals transmitted in a second direction, wherein a wavelength of the first multi-channel optical signals is different from a wavelength of the second multi-chan-nel optical signals, and the first direction is opposite to the second direction;

the reflection component is configured to reflect the second multi-channel optical signals to the first filtering structure;

the first filtering structure is configured to:

transmit the first multi-channel optical signals to the first gain medium; and reflect the second multi-channel optical signals to the first gain medium;

the first gain medium is further configured to perform gain amplification on the second multi-channel optical sig-nals based on the first pump light, wherein the first pump light overlaps each of the second multi-channel optical signals in the first gain medium;

the second filtering structure is further configured to:

transmit, in the first direction, the first multi-channel optical signals on which gain amplification is performed; and reflect, to the reflection component, the second multi-channel optical signals on which gain amplification is performed;

the reflection component is further configured to reflect, to the first filtering structure, the second multi-channel optical signals on which gain amplification is performed; and the first filtering structure is further configured to reflect the second multi-channel optical signals on which gain amplification is performed, wherein the second multi-channel optical signals on which gain amplification is performed and that are reflected by the first filtering structure are transmitted in the second direction.

13. The optical amplification apparatus according to claim 12, wherein:

the reflection component comprises a first reflection element, a second reflection element, a third reflection element, and a fourth reflection element;

the second reflection element is configured to reflect, to the first reflection element, the second multi-channel optical signals reflected by the second filtering structure;

the first reflection element is configured to reflect the second multi-channel optical signals to the first filtering structure;

the third reflection element is configured to reflect, to the fourth reflection element, the second multi-channel optical signals on which gain amplification is performed and that are reflected by the second filtering structure; and the fourth reflection element is configured to reflect, to the first filtering structure, the second multi-channel optical signals on which gain amplification is performed.

14. The optical amplification apparatus according to claim 6, wherein:

a material of the first gain medium is different from a material of the second gain medium, the first gain medium comprises an erbium-doped, a bismuth-doped, or a praseodymium-doped glass block, and the second gain medium comprises an erbium-doped, a bismuth-doped, or a praseodymium-doped glass block;

the optical amplification apparatus further comprises a first beam shaping structure, and the first beam shaping structure comprises a diffractive optical element (DOE) or a lens combination; and a type of the optical fiber comprises a bundled optical fiber or a multi-core optical fiber.

15. The optical amplification apparatus according claim 9, wherein:

the first direction is a direction in which an optical line terminal (OLT) transmits a signal to an optical network unit (ONU), and the second direction is a direction in which the ONU transmits a signal to the OLT; or the first direction is a direction in which an ONU transmits a signal to an OLT, and the second direction is a direction in which the OLT transmits a signal to the ONU.

16. An optical amplification method of an optical amplification apparatus, wherein the optical amplification apparatus is connected to an optical fiber, and the optical amplification apparatus comprises a pump laser, a gain medium, and a beam shaping structure, and wherein the method comprises:

emitting, by the pump laser, pump light;

shaping, by the beam shaping structure, the pump light;

coupling the shaped pump light to the gain medium;

receiving, by the gain medium, multi-channel optical signals from the optical fiber; and performing gain amplification on the multi-channel optical signals based on the shaped pump light, wherein a beam of the shaped pump light intersects with a beam of each of the plurality of channels of optical signals in the gain medium.

17. The optical amplification method according to claim 16, wherein a direction in which the pump light is incident to the gain medium is the same as a direction in which the multi-channel optical signals are incident to the gain medium, and the optical amplification apparatus further comprises a multiplexing structure, and wherein the optical amplification method comprises:

performing, by the multiplexing structure, multiplexing on the pump light and the multi-channel optical signals to obtain a multiplexed signal; and transmitting, by the multiplexing structure, the multiplexed signal to the gain medium.

18. The optical amplification method according to claim 16, wherein a direction in which the pump light is incident to the gain medium is different from a direction in which the multi-channel optical signals are incident to the gain medium.

19. The optical amplification method according to claim 16, wherein the optical amplification apparatus further comprises an isolator, and wherein the optical amplification method comprises:

suppressing, by the isolator, incidence of reflected echo light of the multi-channel optical signals to the gain medium.

20. The optical amplification method according to claim 16, wherein the multi-channel optical signals are transmitted in a first direction, and the optical amplification apparatus further comprises a first filtering structure, a second filtering structure, and a second gain medium, and wherein the optical amplification method comprises:

transmitting, by the first filtering structure, a first optical signal in the multi-channel optical signals to the gain medium; and reflecting, by the first filtering structure, a second optical signal in the multi-channel optical signals to the second gain medium, wherein a wavelength of the first optical signal is different from a wavelength of the second optical signal, and the pump light overlaps the first optical signal in the gain medium;

performing, by the gain medium, gain amplification on the first optical signal based on the pump light;

receiving, by the second gain medium, the pump light;

performing, by the second gain medium, gain amplification on the second optical signal based on the pump light, wherein the pump light overlaps the second optical signal in the second gain medium;

transmitting, by the second filtering structure and in the first direction, the first optical signal on which gain amplification is performed; and reflecting, by the second filtering structure, the second optical signal on which gain amplification is performed, wherein the reflected second optical signal on which gain amplification is performed is transmitted in the first direction.

21. The optical amplification apparatus according to claim 1, wherein the first pump light has a light spot that covers a spatial region through which each of the first multi-channel optical signals propagates in the first gain medium.

22. The optical amplification apparatus according to claim 1, wherein the light spot is rectangular.

\* \* \* \* \*